July 10, 1956 H. A. ROBINSON 2,754,421

FREQUENCY CONTROL SYSTEM

Filed Nov. 19, 1951 4 Sheets-Sheet 1

INVENTOR
Harris A. Robinson
BY
Charles H. Brown
ATTORNEY

INVENTOR
Harris A. Robinson
BY
Charles H. Brown
ATTORNEY

July 10, 1956 H. A. ROBINSON 2,754,421

FREQUENCY CONTROL SYSTEM

Filed Nov. 19, 1951 4 Sheets-Sheet 3

INVENTOR

Harris A. Robinson

BY

Charles H. Brown

ATTORNEY

July 10, 1956 H. A. ROBINSON 2,754,421

FREQUENCY CONTROL SYSTEM

Filed Nov. 19, 1951 4 Sheets-Sheet 4

INVENTOR
Harris A. Robinson
BY
Charles H. Brown
ATTORNEY 2,754,421
Patented July 10, 1956

2,754,421

FREQUENCY CONTROL SYSTEM

Harris A. Robinson, Philadelphia, Pa., assignor, by mesne assignments, to the United States of America as represented by the Secretary of the Air Force Application November 19, 1951, Serial No. 257,148

12 Claims. (Cl. 250—36)

This invention relates to a frequency control system, and more particularly to a frequency control system useful for automatic tuning of a multichannel frequency generator used in a radio transmitter-receiver.

A long range high frequency radio transmitter-receiver presently being developed selectively makes available for transmission and reception, any one channel of the 44,000 channels which are spaced 500 cycles apart throughout the frequency range of 2 to 24 mc. The frequency selection may be made at one (or several) remote control box locations. The features of this transmitter-receiver system include automatic tuning of the receiver-exciter, a 44,000-channel frequency generator with frequency stability of 0.0015 percent as controlled from a stable reference crystal oscillator, and provision for voice, CW or frequency shift telegraphy.

The control system of this invention controls the frequency of a master oscillator in such a way as to provide a multiplicity of frequency channels therefor, more specifically, in the transmitter-receiver referred to, 44,000 channels are provided for the master oscillator, spaced 250 cycles apart in the range of 1.9 to 12.9 mc.

An object of this invention is to provide a system for automatic tuning of an oscillator, whereby increased accuracy of tuning is effected, without sacrificing speed of the tuning cycle.

Another object is to devise a novel automatic tuning system for oscillators.

A further object is to devise a frequency control system in which the outputs of two different types of frequency-responsive circuits are combined in a novel manner for automatic tuning and frequency control purposes.

The foregoing and other objects of the invention will be best understood from the following description of an exemplification thereof, reference being had to the accompanying drawings, wherein:

Fig. 1 (composed of Figs. 1*a* and 1*b* taken together) is a block diagram of a transmitter-receiver with which the arrangement of this invention can be used;

Figure 1A:
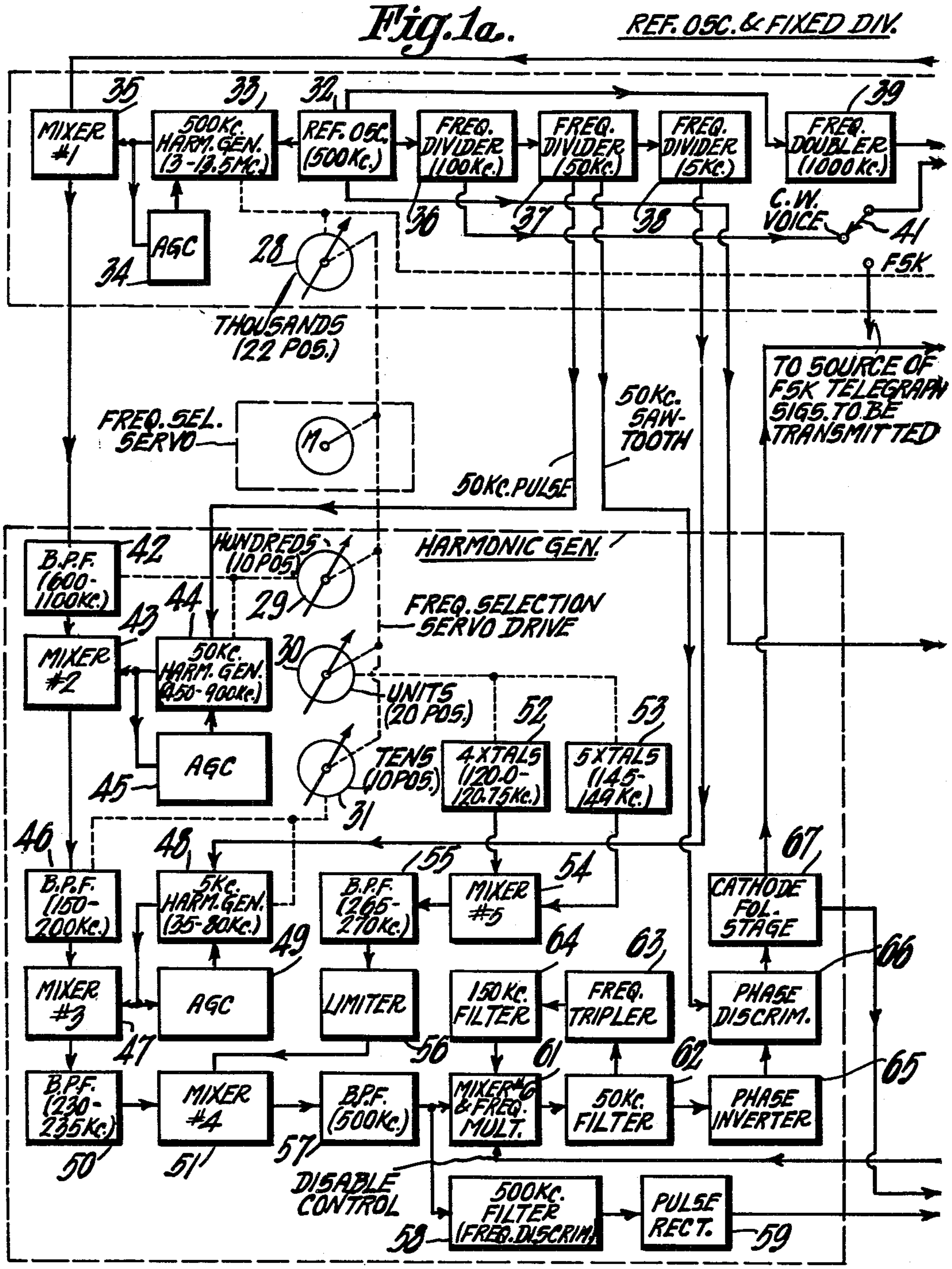

In the operation of the invention, the operator selects the frequency to which he desires the apparatus to be tuned, by manual manipulation of one or more switches. As a result of this manual manipulation, the frequency of a master oscillator (which is used for both receiving and transmitting purposes in a transmitter-receiver) is first varied upward from the low end of a band toward the particular frequency selected, and then when this frequency has been reached and passed, the rate of variation of the master oscillator is slowed down and the direction of variation is reversed, until the frequency of this oscillator corresponds with the particular frequency selected, at which time the master oscillator remains in a relatively fixed frequency position except for intermittent corrections to compensate for slight variations in frequency such as might be due to temperature variations. An important aspect of this invention is the use of both a frequency discriminator and a phase discriminator for controlling the tuning of the master oscillator during the automatic tuning thereof. To provide for a fast tuning cycle, the frequency discriminator alone is used during the first part of the tuning cycle (i. e., prior to the reaching and passing of the frequency selected, by the master oscillator), the phase discriminator being gated "off" during this time; the output of the frequency discriminator, when the frequency selected is reached and passed, is used to gate "on" the phase discriminator so that this last discriminator functions during the final portion of the automatic tuning cycle, thus providing for a high degree of tuning accuracy.

In the particular embodiment of the invention hereinafter described, the output frequency of the master oscillator is sampled and mixed in a plurality of cascaded mixers with frequencies derived from one or more stable crystal-controlled oscillators. The output of the final mixer is fed to a frequency discriminator and also over a separate path through a gate circuit, to a highly accurate phase discriminator in which it is compared with a reference crystal-controlled frequency. A tuning motor drives frequency-controlling elements in the master oscillator and this motor is controlled by the outputs of the frequency and phase discriminators. To counteract slow drifts in frequency of the master oscillator, the phase discriminator output is fed to a reactance tube coupled to said oscillator. The first step in the automatic tuning cycle of the master oscillator and associated gang-tuned circuits comprises a return from the previous setting to the low frequency end of the particular oscillator tuning band selected, during the setting of the frequency determining controls (switches). The tuning motor then drives the master oscillator at high speed, scanning the band toward the high frequency end under the control of the frequency discriminator; during this scansion the phase discriminator is disabled or gated "off" by suitable control of the aforementioned gate circuit. The frequency discriminator functions to provide a control voltage which reverses the direction of tuning drive and slows such drive after the master oscillator has passed through the correct tuning point. This control voltage, in addition to causing a change from the high speed "scan" to a slower reverse drive, enables or gates "on" the phase discriminator, so that the tuning motor control circuit then receives further control voltage from the output of the phase discriminator during the remainder of the automatic tuning cycle. This arrangement provides for the desired fast tuning cycle, in combination with the high degree of tuning accuracy possible only through the use of a phase discriminator. The phase discriminator is enabled or gated "on" to correct slow drifts in frequency of the master oscillator, during normal operation thereof, through control of the master oscillator by the reactance tube.

In the following description, an overall exposition will first be given of the transmitter-receiver in which the arrangement of this invention can be used, following which a detailed exposition of the invention will be provided.

Figure 1B:
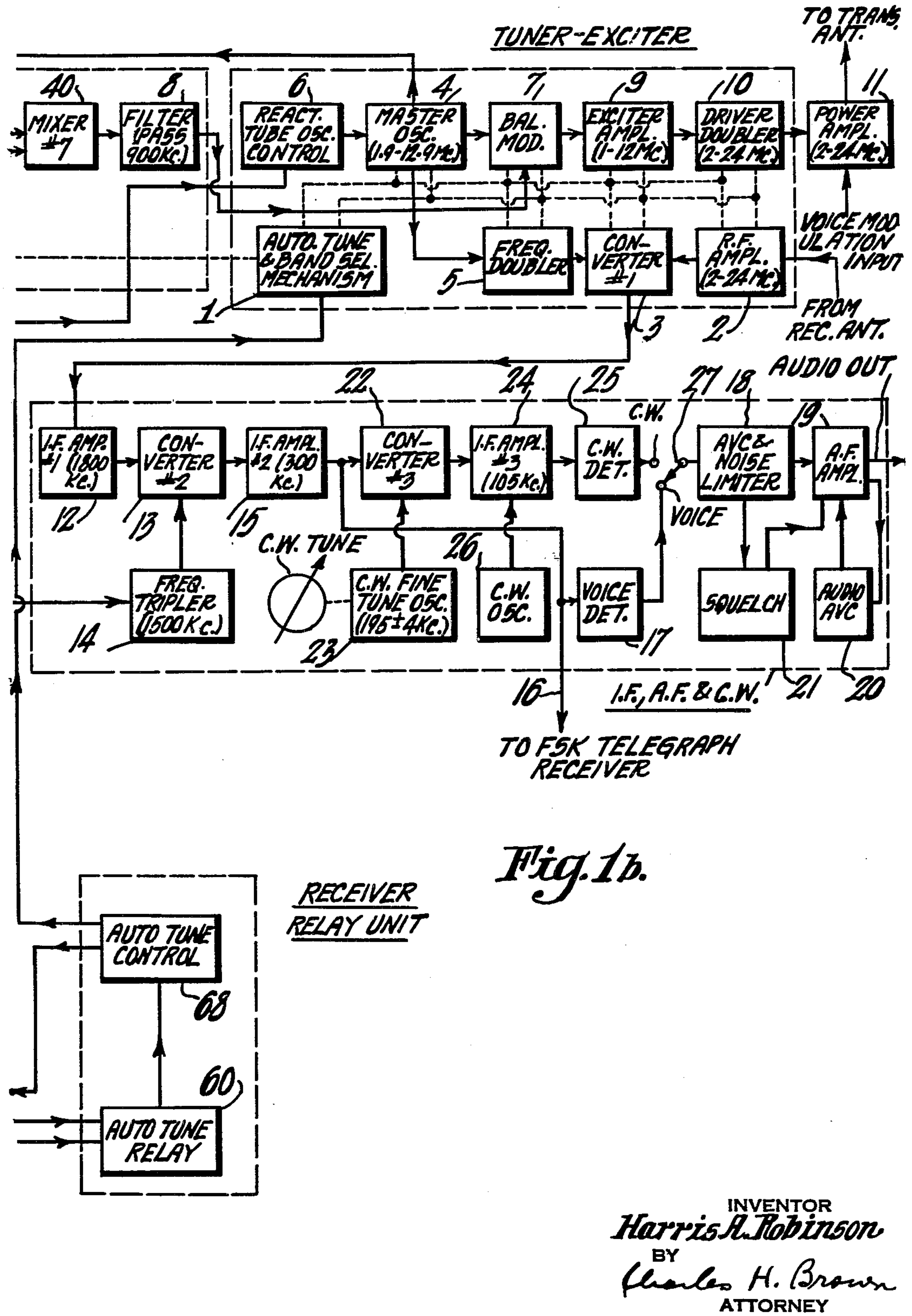

Referring to Fig. 1, the transmitter-receiver as illustrated is composed of six separate units each denoted by a dotted-line enclosure, these units being the Tuner-Exciter Unit, the IF–AF–CW Unit, the Servo Selector or Frequency Selector Servo Unit, the Reference Oscillator and Fixed Divider Unit, the Harmonic Generator Unit and the Receiver Relay Unit. In addition, the complete transmitter-receiver includes certain other units which are not shown in order to not unduly complicate the drawing, these others being the Modulator Servo Unit, the FSK Adapter Unit and the Power Amplifier Unit. However, a portion of the latter unit is illustrated in Fig. 1. In addition, the complete equipment includes certain other auxiliary units, such as power supply units, relay panels, control panels, etc., none of which are illustrated.

First, referring to the Tuner-Exciter Unit, seven boxes are arranged for ganged permeability tuning of the coils therein by an automatic tune and band selecting mechanism 1, to be later referred to in more detail. The first two boxes 2 and 3 function as the receiver RF preamplifier stages and #1 converter or mixer, the RF amplifier 2 receiving the signal from the receiving antenna, amplifying it and passing it on to converter stage 3. The master oscillator 4, which is the oscillator that is to be automatically tuned by the circuit of this invention, is permeability tuned and ganged with the coils in the other boxes, as previously stated. The oscillator 4 has an output frequency of 1.9 to 12.9 mc., as indicated, this frequency being one-half the normal receiver oscillator injection frequency. The output frequency of oscillator 4 is doubled by frequency doubler 5, the output of this doubler being used for injection or heterodyning purposes in converter stage 3. Exact frequency control of oscillator 4 is obtained by means of reactance tube 6 coupled to oscillator 4; this reactance tube will be later referred to further.

A balanced modulator 7 produces one-half the transmitter output signal frequency by combining the output of oscillator 4 with a 900-kc. signal (equal to one-half the first IF) derived from a 900-kc. pass filter 8 in the Reference Oscillator and Fixed Divider Unit. The output of modulator 7 is amplified in the exciter amplifier 9 (which may consist of one or more stages) and then this transmitter excitation is doubled in the driver doubler 10, which may be a push-push type doubler. The output of doubler 10 is fed to a power amplifier 11, to which is also fed voice modulation, and the output of this amplifier goes to a suitable transmitting antenna. Automatic tuning and loading of the transmitter may be accomplished by an arrangement (not shown) including a motor-driven tuning inductance in the tank circuit of amplifier 11 and also a motor-driven tuning capacitor in such tank circuit. Such motors could be controlled by the amplified output of a phase discriminator the inputs to which are taken from doubler 10 and from power amplifier 11, the latter being a so-called "quadrature voltage."

Next, referring to the IF–AF–CW Unit, the 1800 kc. first IF output from converter 3 is coupled through an intermediate frequency amplifier 12 to the #2 converter 13, where it is combined with the 1500 kc. output of the frequency tripler 14 (supplied with 500 kc. input from a stable frequency source), producing the second IF of 300 kc. The output of converter 13 is coupled to the input of IF amplifier 15, operating at 300 kc. and consisting of one or more stages. An electromechanical filter, of the type disclosed in the copending application, Serial No. 151,407, filed March 23, 1950, now abandoned, is preferably used in the coupling between converter 13 and amplifier 15.

Output of 300 kc. from amplifier 15 is inductively coupled to a low impedance transmission line 16 for input to an external FSK telegraph receiver unit (not shown). This receiver unit may include the usual limiter, frequency discriminator, trigger circuit, and printer keyer for operating a telegraph printer from the frequency shifted output of amplifier 15.

For voice reception the 300 kc. output of amplifier 15 is detected in a voice detector 17 and continues through a series noise limiter 18 to the audio frequency amplifier 19, which may consist of a plurality of stages. A delayed audio AVC circuit 20 is provided to limit audio frequency peak output. A delayed AVC diode samples output from amplifier 15 and provides bias for the AVC amplifier and AVC control diode in block 18. An audio squelch arrangement 21 is actuated by the AVC amplifier in 18 and is used to control audio amplifier 19.

For CW reception intermediate frequency of 300 kc. from amplifier 15 is coupled to the #3 converter 22, where it mixes with output from the 195 kc. oscillator 23, having a reactance control therein which provides for fine CW tuning (±4 kc.). Output at 105 kc. from converter 22 is coupled through another electromechanical filter (which may be of the type described in the aforementioned copending application) for sharp selectivity to the 105 kc. amplifier 24 and thence to the CW detector 25. A stabilized 106 kc. beat frequency oscillator 26 supplies wave energy to amplifier 24 to provide CW beat output which may be switched to the audio amplifier by the switch schematically indicated at 27.

Now referring to the Frequency Selector Servo Unit, this unit includes four similar bridge balancing servo selector units driven by a common motor M. The resistance bridges each have a similar bridge section at the remote master control box coupled to the "Units," "Tens," "Hundreds" and "Thousands" frequency selection switches. Disturbing any of the four remote bridge balances by selection of a new frequency (or new control point) starts a tuning cycle, which continues until sensitive bridge relays in the Frequency Selection Servo Unit are again open from rebalancing by the servo selectors driving the local bridge arms, which have associated with them (and therefore driven thereby) the following frequency selection switches: A "Thousands" switch 28 in the Reference Oscillator and Fixed Divider Unit, a "Hundreds" switch 29, a "Units" switch 30 and a "Tens" switch 31, the last three switches being in the Harmonic Generator Unit. In other words, the switches 28, 29, 30 and 31 are driven by the frequency selection servo drive indicated from the Frequency Selection Servo Unit, in such a way as to cause said switches to move to positions corresponding to the frequency selection made at the remote master control box; therefore, the frequency selection servo drive from the Frequency Selection Servo Unit may be said to repeat the switch settings of the "Units," "Tens," "Hundreds" and "Thousands" switches at the remote control box, to the respective switches 30, 31, 29 and 28.

Now reference will be made to the Reference Oscillator and Fixed Divider Unit. The heart of this unit is a hermetically sealed, 500 kc. crystal oscillator 32 which is extremely stable. Oscillator 32 provides the 500 kc. input for frequency tripler 14, previously referred to, by means of the connection indicated. Output of 500 kc. drives the harmonic generator 33. Generator 33 is preferably of the two-stage type described and claimed in my copending application, Serial No. 253,141, filed October 25, 1951, and includes an AGC or AVC arrangement 34. The "Thousands" selection switch 28 has twenty-two positions and is mechanically coupled to frequency selecting means in generator 33 so that any selected one of the 6th through 27th harmonics of the 500 kc. input to generator 33 may be passed from generator 33 to #1 mixer 35, depending upon the position of switch 28 corresponding to the "Thousands" switch setting as repeated by the frequency selection servo drive. The 6th harmonic of the input frequency to generator 33 has a frequency of 3 mc. and the 27th harmonic has a frequency of 13.5 mc. The switch 28 is also mechanically coupled to the band selecting mechanism in block 1, as indicated by the dotted line connection, so as to operate such mechanism to select the band over which frequency scanning of oscillator 4 is to take place. The AGC arrangement 34, and the particular circuit arrangement of harmonic generator 33, function to equalize the harmonic input to mixer 35, regardless of which harmonic is selected, as described in my aforementioned copending application. Output from the master oscillator 4 is also supplied to mixer 35 and this oscillator frequency, beating with the output frequency of generator 33 in said mixer, produces a difference frequency mixer output which is coupled into the Harmonic Generator Unit; this difference frequency may vary from 600 to 1100 kc., depending upon the frequency selection switch settings.

The 500 kc. output of oscillator 32 drives a series of cascaded locked-in oscillator frequency dividers, beginning with a 100 kc. locked-in oscillator 36 the output of which drives a 50 kc. stage 37 whose output in turn drives a 5 kc. stage 38. In actual practice, a 10 kc. stage may be interposed between the 50 kc. and 5 kc. stages, so that a frequency step down of 10:1 will not have to be made by a single stage. The 50 kc. stage 37 includes amplifier and pulse shaper circuits whereby a 50 kc. sawtooth wave and a 50 kc. pulse may be derived from this stage for utilization in circuits to be later described.

A frequency doubler 39 utilizes as input a 500-kc. signal derived from oscillator 32 and produces an output of 1,000 kc. which is fed to #7 mixer 40. A 100-kc. signal is taken from stage 36 and fed to mixer 40, there to mix with the 1,000-kc. signal from doubler 39 to produce the required 900 kc. (equal to one-half the first IF) which is passed by filter 8 and used in balanced modulator 7 for transmission. When the schematically-illustrated switch 41 is in the position illustrated for CW and voice, the action just described takes place. Switch 41 may be thrown to its other position to supply FSK telegraph signals to be transmitted, derived from a suitable source (not shown), to mixer 40, rather than supplying to such mixer the 100 kc. signal from divider 36.

Next, the Harmonic Generator Unit will be described. This unit, in combination with the reference oscillator and fixed divider unit just described, comprises the frequency control system of this invention, which is used principally to control the frequency of oscillator 4. The 600–1100 kc. difference frequency output of mixer 35 is passed through bandpass filter 42 to provide one of the inputs to #2 mixer 43, the other input being provided from the 50 kc. harmonic generator 44. The generator 44 is supplied with 50 kc. pulse input derived from divider stage 37 and harmonics of this input frequency lying in the range of 450 to 900 kc. are selected by the servo selector switch drive positioning the "Hundreds" switch 29, which has ten positions. The particular harmonic of 50 kc. which is selected by switch 29 from generator 44, is passed on to mixer 43 as input to mix with signal from filter 42. The selective circuit in filter 42 is tuned approximately by the "Hundreds" switch drive 29. The harmonic generator 44 includes two stages and an AGC diode 45 which regulates the level at the mixer 43.

Output from mixer 43 is transferred, through the selective circuit bandpass filter 46, tunable in ten steps between 150 and 200 kc. as the "Tens" switch 31 of the servo selector determines, to #3 mixer 47. Switch 31 has ten positions. A 5 kc. harmonic generator 48 is supplied with 5 kc. input derived from divider stage 38 and harmonics of this input frequency lying in the frequency range of 35 to 80 kc. are selected by the servo selector drive positioning the "Tens" switch 31. The particular harmonic of 5 kc. which is selected by switch 31 from generator 48, is passed on to mixer 47 as input to mix with signal from filter 46. Generator 48 includes two stages and an AGC diode 49 which regulates the level at mixer 47.

Output from mixer 47 is transferred through the bandpass filter 50, which passes a frequency band from 230 to 235 kc., to #4 mixer 51. The "Units" servo-switch 30, which has twenty positions, drives crystal selecting switches in crystal oscillator units 52 and 53. One of these selecting switches selects one of the group of four crystals from 120.0 to 120.75 kc. in oscillator 52, while the other selecting switch selects one of the group of five crystals from 145 to 149 kc. in oscillator 53. The crystals in oscillator 52 have frequencies of 120.0, 120.25, 120.5 and 120.75 kc., while those in oscillator 53 have frequencies of 145, 146, 147, 148 and 149 kc. The outputs of the two crystal oscillators 52 and 53 excite #5 mixer 54, the switching actuated by the servo "Units" switch drive 30 being arranged to produce output from mixer 54 of twenty frequencies, spaced every 250 cycles in the range from 265 to 269.75 kc. A bandpass filter 55 couples this mixed crystal output to mixer 51 through a limiter 56.

The output of mixer 51 is nominally 500 kc. In other words, as the master oscillator 4 is scanned through a band of frequencies (the band selected by the "Thousands" switch setting) there will be one segment of the oscillator tuning range, corresponding to the settings of the switches 28–31 (which determine the selected frequencies fed to the several mixers) where a signal near 500 kc. will be developed in the output of mixer 51; this signal output in the vicinity of 500 kc. corresponds closely to the desired correct tuning of the master oscillator 4. A specific numerical example will make this clearer. Suppose that the desired channel, over which signaling is to be carried on, is 5,125.0 kc. (5.125 mc.). In this case, the "Thousands" switch 28 would be set at "5," the "Hundreds" switch 29 at "1," the "Tens" switch 31 at "2" and the "Units" switch 30 at "5.0." In this case the frequency of the output from doubler 5, applied to converter 3, would need to be 6,925.0 kc., in order to produce the required 1800 kc. IF by beating with the 5,125-kc. received-signal input to this converter. This means that the master oscillator frequency would need to be one-half the output frequency of doubler 5, or 3,462.5 kc. This frequency, combined with the 900-kc. frequency in modulator 7, would provide an input frequency of 2,562.5 kc. for doubler 10. The output frequency of doubler 10 would then be the required 5,125.0 kc. for transmission.

Under these conditions, the ninth harmonic of 500 kc. is selected in harmonic generator 33 and this 4500-kc. frequency combines in mixer 35 with the 3,462.5-kc. output of the master oscillator 4, giving a difference frequency of 1037.5 kc. which is passed through filter 42 to mixer 43. The seventeenth harmonic of 50 kc., which is 850 kc., is selected in harmonic generator 44 and this frequency combines with the 1037.5-kc. frequency in mixer 43 to give a difference frequency of 187.5 kc. which is passed through filter 46 to mixer 47. The ninth harmonic of 5 kc., which is 45 kc., is selected in harmonic generator 48 and this frequency combines with the 187.5-kc. frequency in mixer 47 to give a sum frequency of 232.5 kc. which is passed through filter 50 to mixer 51. In the oscillator 52, a frequency of 120.5 kc. is selected, while in the oscillator 53 a frequency of 147 kc. is selected. These latter two frequencies are mixed in mixer 54 to give a sum frequency of 267.5 kc. which is passed through filter 55 to mixer 51. This 267.5-kc. frequency combines with the 232.5-kc. frequency in mixer 51 to give a sum frequency of 500.0 kc. which is passed through a selective filter 57 to a discriminator 58 and also to mixer 61, in the latter to in effect be divided down to 50 kc. which passes through filter 62 to the phase discriminator 66.

Filter 57 transfers the signal in the vicinity of 500 kc. to a highly selective tuned circuit 58 tuned to 500 kc. and functioning as a frequency discriminator. The signal developed at the output of discriminator 58 as the discriminator input frequency passes through 500 kc. is rectified by the pulse rectifier 59 and the resulting pulse is passed on to the automatic tuning relays 60 in the Receiver Relay Unit, for actuating the speed reducing reversing clutch during automatic tuning. The exact manner in which this is brought about will become apparent hereinafter.

The 500 kc. output from filter 57 is also coupled to a regenerative frequency divider, comprising #6 mixer 61 the output of which is fed to a 50 kc. filter or output tank 62, the divider also including a frequency tripler 63 which receives output from filter 62 and also a 150 kc. filter or tank 64 which receives output from tripler 63 and transfers its output signal to the input side of mixer 61, which also functions as a frequency multiplier to multiply the 150 kc. signal received from filter 64 to a frequency of 450 kc. to beat with the 500 kc. signal received from filter 57, thereby producing the 50 kc. required for filter 62. This regenerative frequency divider operates to in effect divide the 500 kc. signal at the output of filter 57 down to a frequency of 50 kc. at the output of filter 62. This frequency division reduces the effects of spurious phase modulation before the signal is applied to the phase discriminator, as described and claimed in my copending application, Serial No. 357,718, filed May 27, 1953.

A biasing circuit labeled "Disable Control" is provided to bias off or gate off the mixer and frequency multiplier 61 during certain portions of the automatic tuning cycle, thus disabling the phase discriminator (which is coupled to the output of mixer 61) during such times. How this disabling or gating off is effected will be explained in detail hereinafter.

An amplifier and phase inverter 65 is coupled to the 50 kc. output of filter 62 and provides balanced 50 kc. signal input to the phase discriminator 66, which is a quadruple diode phase detector. A 50 kc. sawtooth-shaped output is derived from divider stage 37 and supplied as the other input to phase discriminator 66. In the phase detector or discriminator 66 a direct current control output results from the phase comparison of the 50 kc. signal from phase inverter 65 and the 50 kc. sawtooth signal derived from the reference 50 kc. source 37. The control output of the phase discriminator is direct coupled through a cathode follower stage 67 to the automatic tuning relays 60 in the Receiver Relay Unit, in order to control the tuning motor during a portion of the automatic tuning cycle. The output of phase discriminator 66 is also connected through cathode follower 67 to the grid of the reactance tube 6 for the master oscillator 4, in order to correct for slow frequency drifts of the master oscillator.

The final unit to be described is the Receiver Relay Unit. This unit includes a group 60 of automatic tuning relays which, as previously stated, are controlled by the outputs of the pulse rectifier 59 and the cathode follower stage 67, or in other words, by the outputs of the frequency discriminator 58 and the phase discriminator 66. The automatic tuning relays 60 control the automatic tuning control unit 68 which in turn controls the automatic tuning mechanism 1 which tunes the master oscillator and other RF stages in the Tuner-Exciter Unit, in a manner to be more fully set forth as the description proceeds. Generally speaking, the Receiving Relay Unit includes a number of the tubes and relays required for control of the automatic receiver tuning cycle, such as the speed reducing, reversing clutch rarangement, the final tuning control arrangement, and various other cycling and motor control relays.

The foregoing completes the overall description of the transmitter-receiver system in which the arrangement of this invention can be used. We will now proceed to a detailed description of the frequency control system of this invention, in connection with which reference will be made to Fig. 2, in which elements the same as those of Fig. 1 are denoted by the same reference numerals.

As indicated, #4 mixer 51 may be a pentode to one input grid of which an input signal of 230–235 kc. from filter 50 is supplied and to another input grid of which an input signal of 265–270 kc. from limiter 56 is supplied. The output of mixer 51 is nominally 500 kc., or at any rate, as the master oscillator 4 is tuned by its automatic tuning cycle, there will be one segment of the oscillator tuning range where a signal near 500 kc. will be developed in the output of mixer 51. A selective filter 57, tuned to 500 kc., is coupled to the output (anode) of mixer 51 and this filter transfers the signal to the highly selective parallel resonant LC or tuned circuit 58, which functions as a frequency discriminator. The voltage output versus frequency characteristic of circuit 58 has a peaked shape which is typical of such parallel LC networks, and by appropriate design the said characteristic is made quite sharp-peaked. The output of the filter or frequency discriminator 58 is fed to the diode 59 which constitutes a pulse rectifier. The anode of this diode is connected to the upper (ungrounded or high potential) end of filter 58, while the cathode of this diode is connected by way of a voltage divider network including resistors 69 and 70 to the control grid 71 of a gas tube or gaseous discharge device 72. The operating coil of a relay 73 is connected in the anode circuit of tube 72, so that when tube 72 is fired or made conductive this relay is energized to close its normally-open pair of contacts 74 and to open its normally-closed pair of contacts 75. The tube 72 is part of the block 60 in Fig. 1, while relay 73 could be considered part of the block 68.

Contacts 75 are in series between a source of voltage, of 27 volts for example, and the solenoid of a clutch 76, the solenoid being thus energized when contacts 75 are closed and being deenergized when said contacts are open. Clutch 76 is part of the automatic tuning mechanism 1 and couples the tuning motor therein (not shown) to the shaft which drives the permeability tuning elements in master oscillator 4, as well as in the other blocks 2, 3, 5, 7, 9 and 10. When clutch 76 is energized, the tuning motor drives the master oscillator 4 and associated ganged-tuned receiver and transmitter circuits at high speed in one direction, which may be called the "forward" direction. Clutch 76 is a speed-reducing, reversing clutch; when deenergized it causes the drive of the tuning elements to be reversed in direction and slowed in speed, by appropriate control of the coupling between the tuning motor and the tuning elements, in the master oscillator 4 and elsewhere, driven thereby.

One of the two contacts 74 is grounded, while the other is connected through a resistor 77 to the #1 grid 78 of the #6 mixer and frequency multiplier tube 61 the #3 grid of which is connected by a lead 79 to the output of filter 57. The junction point 80 between the ungrounded one of the contacts 74 and the lower end of resistor 77 is connected to a suitable source of cutoff biasing potential, of −20 volts for example, through a resistor 81. When contacts 74 are open, the point 80 is at a potential of −20 volts and this potential applied to grid 78 is sufficient to cutoff or bias off tube 61, thus gating off or disabling such tube and preventing mixing action from taking place therein. However, when contacts 74 are closed, the point 80 is brought to ground potential, thus removing the cutoff bias from grid 78 and enabling or gating on tube 61. The connection from contacts 74 to mixer 61, since it produces the effect just described, is labeled "Disable Control" in Fig. 1.

The output of mixer 61 (which mixer is part of the regenerative frequency divider) goes to the 50 kc. filter or output tank 62, from thence being fed through a capacitor 82 to the harmonic generator (frequency tripler) 63, the output of which is coupled to the 150 kc. filter or tank 64. The 150 kc. signal is fed from tank 64 through a capacitor 83 to grid 78 of mixer 61, where some energy of the third harmonic (450 kc.) of the 150 kc. signal is produced. This 450-kc. energy mixes or beats with the 500-kc. energy supplied via lead 79 to tube 61, producing 50-kc. energy which is selected by filter 62 and passed on through a capacitor 84 to the grid 85 of a phase inverter triode 65. It is desired to be made clear at this juncture that the above-described mixing action takes place in tube 61 only when this tube is enabled or gated on (by the closing of contacts 74) and not when the tube is disabled, gated off or cutoff by the cutoff bias applied to its grid 78 when contacts 74 are open. In other words, no 50-kc.

energy appears on grid 85 when tube 61 is disabled; such energy appears on this grid only when tube 61 is enabled or gated on.

The automatic tuning cycle of the master oscillator 4 comprises a return from the previous setting to the low frequency reference end of the particular oscillator tuning band selected by the "Thousands" or coarse frequency switch 28 setting, during the setting of the frequency determining controls 28–31, through a circuit (not shown) to the tuning motor. Upon completion of these switch settings the tuning motor is reversed and drives the master oscillator and associated ganged tuned receiver and transmitter circuits at high speed, scanning the frequency band toward the high frequency end. There will be one segment of the master oscillator tuning range, corresponding to the settings of the switches 28–31, where a signal near 500 kc. will be developed in the output of mixer 51. This signal output in the vicinity of 500 kc. corresponds closely to the desired correct tuning of the master oscillator. It may be seen that the switches 28–31 determine the frequencies fed to the several mixers 35, 43, 47, 54 and 51, and that the master oscillator frequency is also fed into the chain of cascaded mixers, beginning with mixer 35 to which such frequency is fed directly.

During the high speed "scan" or frequency variation of the master oscillator, relay 73 is unenergized and has the position illustrated. Its contacts 75 are closed, energizing clutch 76 to cause scansion to take place at high speed in a forward direction. Contacts 74 are open, so that point 80 is at a substantial negative potential, disabling tube 61 by biasing its grid 78 beyond cutoff, thus preventing the appearance of any 50 kc. energy at the tube's output.

As the signal output of mixer 51 passes through the correct 500 kc. frequency, the output voltage of the sharply tuned filter or frequency discriminator 58 reaches a peak. This signal is rectified by diode 59 in a half-wave manner, to apply a positive pulse from its cathode to grid 71 of the gas tube 72. The positive pulse triggers or fires tube 72, the flow of current through this tube energizing relay 73, closing contacts 74 and opening contacts 75. The speed-reducing, reversing clutch 76 is actuated (by deenergization of its solenoid) when contacts 75 are opened. As a result, the direction of tuning or frequency variation is reversed and the speed of tuning is reduced, thus causing completion of the tuning to take place at relatively slow speed in the reverse direction.

The closing of contacts 74 removes the disable bias from mixer tube 61 by grounding point 80, so that during the time relay 73 is energized, that is, during the reverse-direction, slow-speed final portion of the automatic tuning cycle, tube 61 is active or enabled or gated on, thus providing a 50 kc. input on grid 85 of the phase inverter 65.

The amplifier and phase inverter tube 65, to the grid 85 of which the 50 kc. signal from mixer 61 and filter 62 is applied when mixer 61 is enabled, amplifies the 50 kc. signal and provides 50 kc. balanced push-pull output which is utilized as signal input to the quadruple diode phase detector or phase discriminator 66, through coupling capacitors 86 and 87. The four diodes of the phase detector are denoted by numerals 88, 89, 90 and 91. One of the 50 kc. outputs of phase inverter 65 goes through capacitor 86 to the cathodes of diodes 88 and 90, while the other push-pull output goes through capacitor 87 to the anodes of diodes 89 and 91 and through a resistor 92 to the cathode of diode 88. For phase comparison with the approximately 50 kc. signal input from inverter 65, a standard or reference 50 kc. sawtooth-shaped input, derived from the reference crystal (from frequency divider stage 37, Fig. 1), is applied to the cathode of diode 89 and to the anode of diode 88. In the phase detector or discriminator 66, the D. C. control output results from the phase comparison of the 50 kc. sawtooth reference wave and the 50 kc. signal from inverter 65.

The D. C. control output of phase discriminator 66 is taken from the joined-together cathode of diode 91 and the anode of diode 90. Filtered by the capacitor 93, the phase discriminator output is direct coupled to the grid 94 of a triode 67 connected as a cathode follower amplifier stage. A resistor 96 is connected from the cathode 95 of tube 67 to ground.

From the cathode 95 of the cathode follower, the D. C. control output of the phase discriminator is applied to the grid of the reactance tube 6 to control the frequency of the master oscillator 4. In this way, during normal operation of the transmitter-receiver of this invention (tube 61 being then gated on), the phase discriminator very accurately controls the frequency of master oscillator 4, a correcting voltage out of the phase discriminator appearing whenever oscillator 4 tends to drift in frequency; the frequency of this oscillator is then maintained very accurately at its proper value by the phase comparison with a highly stable crystal-controlled frequency.

From the cathode 95 of cathode follower 67, the phase discriminator output is also applied through a resistor 97 to the control grid of a pentode 98, which functions as a final tuning control tube in the anode circuit of which a relay 99 is connected. Anode current flow in tube 98 causes energization of relay 99 to close its pair of normally-open contacts 100 and to open its pair of normally-closed contacts 101. Closure of contacts 100 completes a circuit between a source of potential of +27 volts and a tuning motor control relay, so that said control relay is energized when contacts 100 are closed. Opening of contacts 101 breaks a circuit between the 27-volt source and a reversing relay for the tuning motor, the reversing relay then being energized when these contacts are closed.

The final tuning control is effected by tube 98 and relay 99 and is responsive to the output of phase discriminator 66. There has previously been described a portion of the automatic tuning cycle of the master oscillator 4, up to the point at which the information from the frequency discriminator 58 has actuated the tuning control clutch to change from the high speed scan in the forward direction of increasing frequency to a slower speed scan in the reverse direction, that is, in the direction of decreasing frequency. At the time of this slowing in speed and reversal, as previously described, the phase discriminator is enabled by gating on tube 61. Thus, the tuning motor control, through tube 98, relay 99 and other associated relays, is now switched to receive further control voltage from the output of the highly accurate phase discriminator 66. The final accurate tuning voltage from this phase discriminator can now actuate the tuning motor control; the description will now proceed from this point. The phase discriminator 66 has a familiar S-shaped output voltage versus phase characteristic. At the time that enabling of the phase discriminator 66 occurs, the master oscillator is generally beyond the capture range of the phase discriminator-reactance tube control. However, as the tuning motor drive proceeds (at reduced speed) in a direction to return the master oscillator toward the correct tuning point, the phase discriminator and associated reactance tube take control. Thereafter, the D. C. error voltage from phase discriminator 66 through cathode follower 67 is used to control the tuning motor by means of the control tube 98, its associated anode circuit relay 99, and auxiliary relays (not shown), to center the tuning of the master oscillator on the phase discriminator output characteristic. The control tube 98 and associated relays 99, etc. is but one of many arrangements well known to the art, for accomplishing this final tuning in response to the error voltage developed in the phase discriminator. The automatic tuning cycle of master oscillator 4 is thus completed and this oscillator is brought to the desired new frequency.

Figure 2:
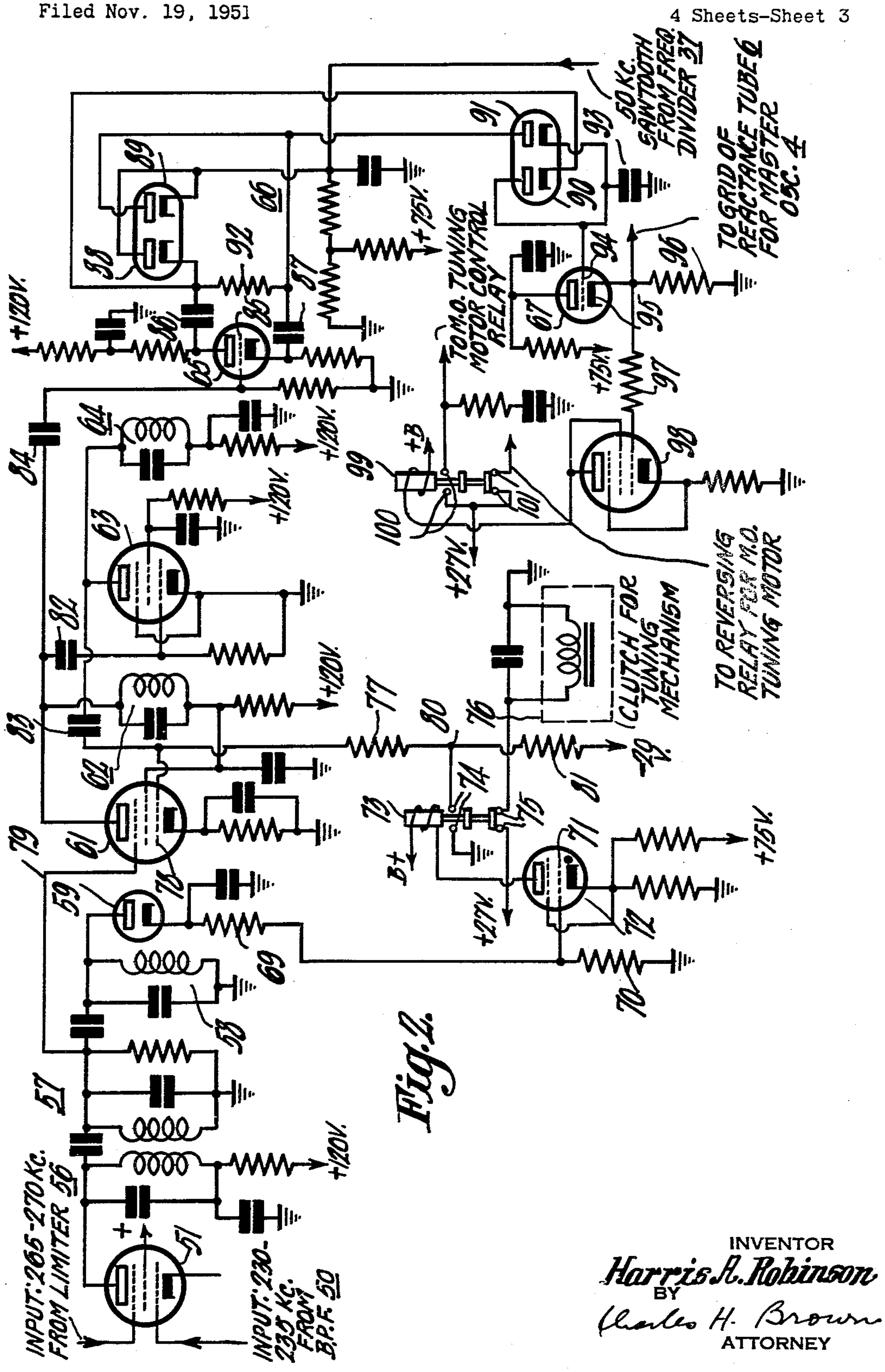
Fig. 2 is a circuit diagram of an arrangement according to this invention.
Figure 3:
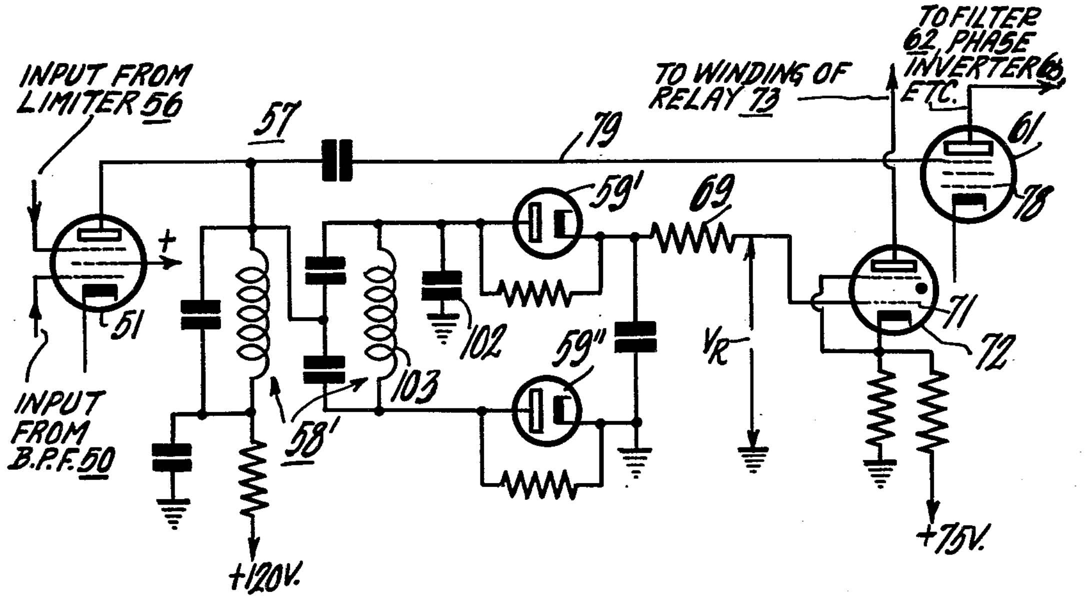
Fig. 3 is a diagram of a modification of Fig. 2.

An alternative circuit arrangement is shown in Fig. 3, in which elements the same as those of Figs. 1 and 2 are denoted by the same reference numerals. In Fig. 3 a frequency discriminator 58′ such as is well known in the art is used, instead of the simple tuned circuit discriminator 58 of Fig. 2. Discriminator 58′ includes a tuned input arrangement tuned to 500 kc., including a secondary winding 103 coupled to a primary winding constituted by the inductance of tuned circuit 57. A capacitor 102 is connected from the upper end of secondary winding 103 to ground. The discriminator input arrangement feeds the signal output of #4 mixer 51 to the differentially-connected diode rectifiers 59′ and 59″, connected to opposite ends of winding 103. One end of a resistor 69 is connected to the cathode of diode 59′ (the cathode of diode 59″ being grounded) and the output voltage $V_R$ of the discriminator-detector appears between the other end of this resistor and ground. This output voltage $V_R$ is applied to the grid 71 of the clutch control tube 72 previously described. It will be remembered that the winding of relay 73 is in the anode circuit of tube 72.

Figure 4:
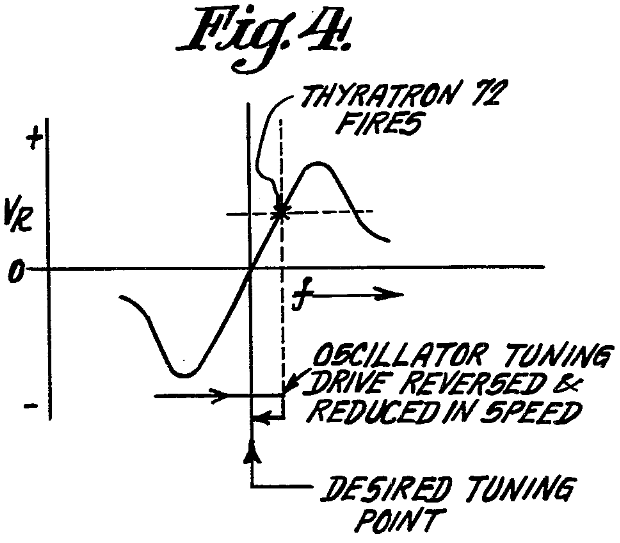
Fig. 4 is a characteristic curve useful in explaining the operation of Fig. 3.

The frequency discriminator-detector output voltage $V_R$ plotted against input frequency to the discriminator, has the familiar S-shape illustrated in Fig. 4. In Fig. 3, the connections and arrangement of the discriminator-detector are such that the characteristic is as represented in Fig. 4—that is, a positive output voltage $V_R$ is produced as the input frequency passes through the 500-kc. tuning point in the direction of increasing frequency.

As previously described, the automatic tuning cycle begins with high speed scanning of the frequency band and is completed by the actuation of a speed reducing, reversing clutch. It is therefore essential that the tuning motor control relay (for the speed reducing, reversing clutch) be actuated only when the tuning of the master oscillator has proceeded to the high frequency (or far) side of the correct 500 kc. discriminator input frequency, it being remembered that the high speed scansion takes place in the direction of increasing frequency. When this far side is reached, the control relay actuates the speed reducing, reversing clutch, reversing the direction of the tuning motor drive and completing the final tuning of the master oscillator at relatively slow speed.

The arrangement of Fig. 3 functions in the same manner as does the Fig. 2 arrangement, with the added advantage that the positive voltage output $V_R$ (a positive voltage being necessary to fire thyratron 72 by means of its grid and to thus operate the reversing and speed reducing clutch 76 by energizing relay 73) is definitely located on the far side of the desired oscillator tuning point; see Fig. 4 and the previous description. Thus, operation of the reversing and speed reducing clutch takes place on the correct side (far side) of the desired oscillator tuning point. In other words, the positive voltage $V_R$ necessary to actuate the control relay 73 is developed only after the tuning has passed through the 500 kc. correct point toward the high frequency side. In this connection, it is desired to be again pointed out that there will be one segment of the master oscillator tuning range, corresponding to the settings of the switches 28–31, where a signal near 500 kc. will be developed in the output of mixer 51. This signal output in the vicinity of 500 kc. corresponds closely to the desired correct tuning of the master oscillator; the discriminator 58′, it will be remembered, is tuned to 500 kc., so that in Fig. 4 the "desired tuning point" (the point at which the S-shaped curve crosses the horizontal axis) is located at a frequency of 500 kc.

It may be seen, from all of the foregoing, that the improved accuracy in tuning obtained by this invention results from the use of the approximate information from the frequency discriminator (of either the type illustrated at 58 in Fig. 2 or the type illustrated at 58′ in Fig. 3) to change from the high speed "forward" frequency scan to a slower speed reverse drive (by the operation of the speed-reducing, reversing clutch 76), and from the switching of the tuning motor control circuit (including tube 98 and relay 99), at the time of this reversal, to receive further control voltage from the output of the highly accurate phase discriminator 66 (by the gating on of tube 61). The arrangement of this invention therefore provides the fast automatic tuning cycle desired, in combination with the high degree of tuning accuracy possible only from a phase discriminator.

What is claimed is:

1. In an automatic tuning system for an oscillator, a tuning motor arranged to vary the frequency of the oscillator in one direction through a given frequency band, a tuned frequency discriminator, means for supplying to said discriminator a wave the frequency of which is representative of the frequency of said oscillator, said discriminator functioning to produce a characteristic output in response to the passage of said wave through a predetermined frequency, means coupled to receive output from said discriminator and acting in response to the appearance of said characteristic output, for reversing the direction of frequency variation of said oscillator, a phase discriminator separate from said frequency discriminator, a coupling for supplying to said phase discriminator a wave the frequency of which is representative of the frequency of said oscillator, means for supplying to said phase discriminator a stable reference frequency wave, means responsive to the output of said phase discriminator for varying the operation of said tuning motor, and means coupled to the output of said frequency discriminator and responsive solely to such output for completing the signal path through said coupling during the frequency variation of said oscillator in said reverse direction.

2. In an automatic tuning system for an oscillator, a tuning motor arranged to vary the frequency of the oscillator in one direction through a given frequency band, a tuned frequency discriminator, means for supplying to said discriminator a wave the frequency of which is representative of the frequency of said oscillator, said discriminator functioning to produce a characteristic output in response to the passage of said wave through a predetermined frequency, means coupled to receive output from said discriminator and acting in response to the appearance of said characteristic output, for reversing the direction of frequency variation of said oscillator, a phase discriminator separate from said frequency discriminator, a coupling for supplying to said phase discriminator a wave the frequency of which is representative of the frequency of said oscillator, means for supplying to said phase discriminator a stable reference frequency wave, means responsive to the output of said phase discriminator for varying the operation of said tuning motor, means in said coupling for opening the signal path therethrough prior to the passage through said predetermined frequency of the wave supplied to said frequency discriminator, and means coupled to the output of said frequency discriminator and responsive solely to said characteristic output for rendering said signal path opening means ineffective.

3. In an automatic tuning system for an oscillator, means driving the frequency of the oscillator in a predetermined direction through a given frequency band, a frequency discriminator, means for supplying to said discriminator a wave the frequency of which is representative of the frequency of said oscillator, said discriminator functioning to produce a characteristic output in response to the passage of said wave to the far side, with respect to said predetermined direction, of a predetermined frequency, means coupled to receive output from said discriminator and acting in response to the appearance of said characteristic output, for reversing the direction of frequency drive of said oscillator and for reducing the rate of said frequency drive, thereby to return the frequency of said supplied wave toward said predetermined frequency, a phase discriminator, a coupling for supplying to said phase discriminator a wave the frequency of which is representative of the frequency of said oscillator, means for supplying to said phase discriminator a stable reference frequency wave, means responsive to the output of said phase discriminator for varying the operation of said driving means, and means coupled to the output of said frequency discriminator and responsive solely to such output to open the signal path through said coupling prior to the passage of the wave supplied to said frequency discriminator to the far side of said predetermined frequency and to complete the signal path through said coupling subsequent to the passage of the wave supplied to said frequency discriminator to the far side of said predetermined frequency.

4. In an automatic tuning system for an oscillator, means driving the frequency of the oscillator through a given frequency band, a sharply tuned resonant circuit, means for supplying to said circuit a wave the frequency of which is representative of the frequency of said oscillator, said circuit functioning to produce a sharply peaked output in response to the passage of said wave through the frequency to which said circuit is tuned, means for rectifying the sharply peaked output of said resonant circuit to produce a pulse, means responsive to said pulse for varying the operation of said driving means, a phase discriminator, a coupling for supplying to said discriminator a wave the frequency of which is representative of the frequency of said oscillator, means for supplying to said discriminator a stable reference frequency wave, means responsive to the output of said discriminator for varying the operation of said driving means, and means coupled to the output of said resonant circuit and responsive solely to such output for completing the signal path through said coupling during a portion of the frequency drive of said oscillator through said band.

5. In an automatic tuning system for an oscillator, means driving the frequency of the oscillator through a given frequency band, a sharply tuned resonant circuit, means for supplying to said circuit a wave the frequency of which is representative of the frequency of said oscillator, said circuit functioning to produce a sharply peaked output in response to the passage of said wave through the frequency to which said circuit is tuned, means for rectifying the sharply peaked output of said resonant circuit to produce a pulse, means responsive to said pulse for varying the operation of said driving means, a phase discriminator, a coupling for supplying to said discriminator a wave the frequency of which is representative of the frequency of said oscillator, means for supplying to said discriminator a stable reference frequency wave, means responsive to the output of said discriminator for varying the operation of said driving means, means in said coupling for opening the signal path therethrough prior to the passage of the wave supplied to said resonant circuit through the frequency to which said circuit is tuned, and means coupled to the output of said resonant circuit and responsive solely to said peaked output for rendering said signal path opening means ineffective.

6. In an automatic tuning system for an oscillator, means for tuning said oscillator, a tuned frequency discriminator coupled to receive energy representative of the output of said oscillator and responsive to the passage of the oscillator frequency through a predetermined value for providing a unidirectional output, a circuit coupling the output of said frequency discriminator and said tuning means for varying the operation of said tuning means, a phase discriminator separate from said frequency discriminator coupled to receive energy representative of the output of said oscillator and from a source of reference frequency and responsive to phase differences between the two outputs it receives for providing a unidirectional output, a circuit coupling the output of said phase discriminator and said tuning means for varying the operation of said tuning means, and means coupled to the output of said frequency discriminator and responsive solely to such output for varying the signal transmission characteristics of the coupling between said oscillator output and said phase discriminator.

7. In an automatic tuning system for an oscillator, means for tuning said oscillator, a tuned frequency discriminator coupled to receive energy representative of the output of said oscillator and responsive to the passage of the oscillator frequency through a predetermined value for providing a unidirectional output, a circuit coupling the output of said frequency discriminator and said tuning means for varying the operation of said tuning means, a phase discriminator separate from said frequency discriminator coupled to receive energy representative of the output of said oscillator and from a source of reference frequency and responsive to phase differences between the two outputs it receives for providing a unidirectional output, a circuit coupling the output of said phase discriminator and said tuning means for varying the operation of said tuning means, and means coupled to the output of said frequency discriminator and responsive solely to such output for completing the signal path through the coupling between said oscillator output and said phase discriminator, subsequent to the pasage of the oscillator frequency through said predetermined value.

8. In an automatic tuning system for an oscillator, means driving the frequency of the oscillator through a given frequency band, a tuned frequency discriminator, means for supplying to said discriminator a wave the frequency of which is representative of the frequency of said oscillator, said discriminator functioning to produce a characteristic output in response to the passage of said wave through a predetermined frequency, means coupled to receive output from said discriminator and acting in response to the appearance of said characteristic output, for varying the operation of said driving means, a phase discriminator separate from said frequency discriminator, a coupling for supplying to said phase discriminator a wave the frequency of which is representative of the frequency of said oscillator, means for supplying to said phase discriminator a stable reference frequency wave, means responsive to the output of said phase discriminator for varying the operation of said driving means, and means coupled to the output of said frequency discriminator and responsive solely to such output for varying the signal transmission characteristics of said coupling.

9. In an automatic tuning system for an oscillator, means driving the frequency of the oscillator through a given frequency band, a tuned frequency discriminator, means for supplying to said discriminator a wave the frequency of which is representative of the frequency of said oscillator, said discriminator functioning to produce a characteristic output in response to the passage of said wave through a predetermined frequency, means coupled to receive output from said discriminator and acting in response to the appearance of said characteristic output, for varying the operation of said driving means, a phase discriminator separate from said frequency discriminator, a coupling for supplying to said phase discriminator a wave the frequency of which is representative of the frequency of said oscillator, means for supplying to said phase discriminator a stable reference frequency wave, means responsive to the output of said phase discriminator for varying the operation of said driving means, and means coupled to the output of said frequency discriminator and responsive solely to such output for completing the signal path through said coupling subsequent to the passage through said predetermined frequency of the wave supplied to said frequency discriminator.

10. In an automatic tuning system for an oscillator, means driving the frequency of the oscillator through a given frequency band, a sharply tuned resonant circuit, means for supplying to said circuit a wave the frequency of which is representative of the frequency of said oscillator, said circuit functioning to produce a sharply peaked output in response to the passage of said wave through the frequency to which said circuit is tuned, means coupled to receive output from said circuit and acting in response to the appearance of said peaked output, for varying the operation of said driving means, a phase discriminator, a coupling for supplying to said discriminator a wave the frequency of which is representative of the frequency of said oscillator, means for supplying to said discriminator a stable reference frequency wave, means responsive to the output of said discriminator for varying the operation of said driving means, and means coupled to the output of said resonant circuit and responsive solely to such output for completing the signal path through said coupling during a portion of the frequency drive of said oscillator through said band.

11. In an automatic tuning system for an oscillator, means driving the frequency of the oscillator through a given frequency band, a tuned frequency discriminator, means for supplying to said discriminator a wave the frequency of which is representative of the frequency of said oscillator, said discriminator functioning to produce a characteristic output in response to the passage of said wave through a predetermined frequency, means coupled to receive output from said discriminator and acting in response to the appearance of said characteristic output, for varying the operation of said driving means, a phase discriminator separate from said frequency discriminator, a coupling for supplying to said phase discriminator a wave the frequency of which is representative of the frequency of said oscillator, means for supplying to said phase discriminator a stable reference frequency wave, means responsive to the output of said phase discriminator for varying the operation of said driving means, means in said coupling for opening the signal path therethrough prior to the passage through said predetermined frequency of the wave supplied to said frequency discriminator, and means coupled to the output of said frequency discriminator and responsive solely to said characteristic output for rendering said signal path opening means ineffective.

12. In an automatic tuning system for an oscillator, means driving the frequency of the oscillator through a given frequency band, a sharply tuned resonant circuit, means for supplying to said circuit a wave the frequency of which is representative of the frequency of said oscillator, said circuit functioning to produce a sharply peaked output in response to the passage of said wave through the frequency to which said circuit is tuned, means coupled to receive output from said circuit and acting in response to the appearance of said peaked output, for varying the operation of said driving means, a phase discriminator, a coupling for supplying to said discriminator a wave the frequency of which is representative of the frequency of said oscillator, means for supplying to said discriminator a stable reference frequency wave, means responsive to the output of said discriminator for varying the operation of said driving means, means in said coupling for opening the signal path therethrough prior to the passage of the wave supplied to said resonant circuit through the frequency to which said circuit is tuned, and means coupled to the output of said resonant circuit and responsive solely to said peaked output for rendering said signal path opening means ineffective.

References Cited in the file of this patent

UNITED STATES PATENTS

| | | |
|---|---|---|
| 2,406,125 | Ziegler | Aug. 20, 1946 |
| 2,452,575 | Kenney | Nov. 2, 1948 |
| 2,474,354 | Guanella | June 28, 1949 |
| 2,565,876 | Nicholson | Aug. 28, 1951 |
| 2,568,412 | Robinson | Sept. 18, 1951 |
| 2,581,594 | MacSorley | Jan. 8, 1952 |
| 2,605,425 | Hugenholtz | July 29, 1952 |
| 2,610,297 | Leed | Sept. 9, 1952 |
| 2,616,049 | Bailey | Oct. 28, 1952 |